United States Patent
Brusco

(10) Patent No.: US 9,539,776 B2
(45) Date of Patent: Jan. 10, 2017

(54) FILLING CONNECTOR WITH INTEGRATED VENTILATION DUCT

(71) Applicant: Roechling Automotive AG & Co. KG, Mannheim (DE)

(72) Inventor: Mirco Brusco, Leifers (IT)

(73) Assignee: Röchling Automotive SE & Co. KG, Mannheim (DE)

( * ) Notice: Subject to any disclaimer, the term of this patent is extended or adjusted under 35 U.S.C. 154(b) by 251 days.

(21) Appl. No.: 14/057,114

(22) Filed: Oct. 18, 2013

(65) Prior Publication Data
US 2014/0116548 A1   May 1, 2014

(30) Foreign Application Priority Data
Oct. 26, 2012 (DE) .................. 10 2012 219 615

(51) Int. Cl.
| | | |
|---|---|---|
| F16L 3/00 | (2006.01) | |
| B29D 23/00 | (2006.01) | |
| F16L 9/19 | (2006.01) | |
| B29C 45/17 | (2006.01) | |

(52) U.S. Cl.
CPC ......... *B29D 23/001* (2013.01); *B29C 45/1704* (2013.01); *F16L 9/19* (2013.01); *B29C 2045/1707* (2013.01); *B29C 2045/1719* (2013.01); *Y10T 137/87153* (2015.04)

(58) Field of Classification Search
USPC .......................... 138/106, 107, 115, DIG. 11
See application file for complete search history.

(56) References Cited

U.S. PATENT DOCUMENTS

| 2,908,299 A | * | 10/1959 | Gosselin | ................. B67D 7/54 138/111 |
| 4,135,562 A | | 1/1979 | Martineau et al. | |
| 4,768,566 A | * | 9/1988 | Ito | .......................... B60K 15/04 137/588 |

(Continued)

FOREIGN PATENT DOCUMENTS

| DE | 29 913 951 U1 | 1/2001 |
| EP | 1 441 935 B1 | 10/2006 |

OTHER PUBLICATIONS

German Search Report cited in 10 2012 219 615.3 dated Aug. 8, 2013 (5 pgs.).

*Primary Examiner* — James Hook
(74) *Attorney, Agent, or Firm* — Rothwell, Figg, Ernst & Manbeck, P.C.

(57) ABSTRACT

A filling connector (10) for filling a liquid container comprises a liquid pipeline (12), for conveying liquid from a liquid inlet end (16) portion having a liquid inlet opening (14) to a liquid outlet end portion (20) having a liquid outlet opening (18), and further comprises a gas pipeline (22), for conveying gas in the opposite flow direction while liquid is conveyed through the liquid pipeline (12), from a gas inlet end portion (26) having a gas inlet opening (24) to a gas outlet end portion (30) having a gas outlet opening (28), the liquid pipeline (12) and the gas pipeline (22) being formed integrally with one another and the filling connector (10) being formed as an injection-molded part, the gas pipeline (22) being manufactured using injection technology, such as fluid injection technology, in particular water injection technology, particularly preferably gas injection technology or projectile injection technology.

21 Claims, 2 Drawing Sheets

(56) References Cited

U.S. PATENT DOCUMENTS

| | | | |
|---|---|---|---|
| 5,225,632 A * | 7/1993 | Gorin | B64G 1/22 138/107 |
| 5,343,902 A | 9/1994 | Ramioulle | |
| 5,450,884 A * | 9/1995 | Shih | B67D 7/42 138/115 |
| 5,570,672 A * | 11/1996 | Kunimitsu | B60K 15/035 123/516 |
| 6,063,315 A | 5/2000 | Keller et al. | |
| 6,125,891 A * | 10/2000 | Witmer | C04B 35/565 138/106 |
| 6,148,848 A * | 11/2000 | Freed | B67D 7/32 137/312 |
| 6,475,425 B1 | 11/2002 | Filion et al. | |
| 7,017,629 B2 | 3/2006 | Winterling | |
| 7,038,133 B2 * | 5/2006 | Arai | H02G 3/0487 138/115 |
| 7,168,466 B2 * | 1/2007 | Ganachaud | B60K 15/04 141/286 |
| 7,753,082 B2 * | 7/2010 | Anno | F16L 11/20 138/108 |
| 8,978,711 B2 * | 3/2015 | Satou | F16L 9/19 138/114 |
| 2004/0239010 A1 * | 12/2004 | Miura | B29C 47/126 264/572 |
| 2005/0205156 A1 * | 9/2005 | Ganachaud | B60K 15/04 141/286 |
| 2005/0205160 A1 * | 9/2005 | Ganachaud | B60K 15/04 141/351 |
| 2007/0261752 A1 * | 11/2007 | McClung | B60K 15/03177 138/137 |
| 2009/0014091 A1 * | 1/2009 | Kobayashi | B60K 15/04 141/286 |
| 2009/0120522 A1 * | 5/2009 | Ziaei | F02C 7/222 138/115 |
| 2009/0255602 A1 * | 10/2009 | McMasters | B23P 6/007 138/115 |
| 2011/0011860 A1 * | 1/2011 | Smith | B63B 25/082 220/86.2 |
| 2012/0074137 A1 * | 3/2012 | Randolph | B60K 15/0406 220/86.2 |
| 2013/0269532 A1 * | 10/2013 | Kimoto | B01D 53/0446 96/108 |
| 2014/0000745 A1 * | 1/2014 | Bednarz | F01N 13/1822 138/106 |

* cited by examiner

FILLING CONNECTOR WITH INTEGRATED VENTILATION DUCT

CROSS REFERENCE TO RELATED APPLICATION

This application claims the benefit of German Patent Application No. 10 2012 219 615.3 filed on Oct. 26, 2012, the disclosure of which is incorporated herein in its entirety by reference.

The present invention relates to a filling connector for filling a liquid container, comprising a liquid pipeline, for conveying liquid from a liquid inlet end portion having a liquid inlet opening to a liquid outlet end portion having a liquid outlet opening, and further comprising a gas pipeline, for conveying gas in the opposite flow direction while liquid is conveyed through the liquid pipeline, from a gas inlet end portion having a gas inlet opening to a gas outlet end portion having a gas outlet opening, the liquid pipeline and the gas pipeline being formed integrally with one another.

Filling connectors of this type are used for example when filling liquid containers, for example windscreen wiper systems, in vehicles. When the liquid container is filled with liquid, the liquid flowing into the container displaces gas which is initially present there, generally air. This displaced gas flows out of the liquid container, in the opposite flow direction from the liquid flowing in. So as to prevent the fluids which flow in opposite directions from colliding, which might disrupt the filling of the liquid container, a respective pipeline is formed for the liquid on the one hand and the gas on the other hand, the two fluids being able to flow substantially separately from one another in said pipelines. To simplify the manufacture and assembly of the filling connector, it is known to form the gas pipeline provided for the gas flow and the liquid pipeline provided for the liquid flow in a single piece.

A filling connector of this type is known for example from EP 1 441 935 B1. In the filling connector known from this document, in the form of a blow-moulded part, the gas pipeline and the liquid pipeline are formed by crimping an axial wall portion of a tubular blank. The gas pipeline formed in this manner is arranged entirely outside the liquid pipeline and connected thereto via a connection web which corresponds to the crimped axial wall portion of the blank.

A major drawback of the filling connector known from this document is that a gas pipeline formed in this manner can only be formed with a uniform internal cross-sectional area in short axial portions of the filling connector which are straight or only slightly curved.

Moreover, the known shape, having the connecting web between the gas pipeline and the liquid pipeline, results in an unnecessarily large installation space being required for accommodating the filling connector.

In this context, in liquid containers in places which are hard to access, such as in liquid containers in the engine compartment of a vehicle, there is generally only little space available for accommodating a filling connector. Therefore, the shape of the filling connector has to be matched optimally to the existing spatial constraints, but at the same time sufficient flow cross-sectional areas of the gas and liquid pipelines have to be provided.

Against this background, the object of the present invention is to specify technical teaching for providing a filling connector for filling even a liquid container which is arranged in places which are hard to access.

In accordance with a first aspect of the invention, this object is achieved by a conventional filling connector, which is formed as an injection-moulded part, the gas pipeline being manufactured using injection technology, such as fluid injection technology, in particular water injection technology, particularly preferably gas injection technology or projectile injection technology.

To form a filling connector of this type, flowable moulding material is initially poured into an injection-moulding mould, and subsequently filled-in moulding material is displaced in part by injecting a fluid to form the gas pipeline. In this way, on the one hand the external shape of the filling connector, which is determined by the injection moulding mould, can be adapted very precisely to respective installation conditions, such as those in the engine compartment of a vehicle. On the other hand, since the flow path of the injected fluid can be adapted exactly to the shape of the desired filling connector, using cavity portions provided specifically for this purpose, the gas pipeline can be formed on virtually any desired form of filling connector whilst still having a sufficient internal cross-sectional area, and unlike in the prior art is not restricted to short, slightly curved axial portions of the filling connector.

Further, gas pipelines which are formed using fluid injection technology, such as water injection technology or gas injection technology, can be manufactured with very low wall thicknesses, in such a way that in total the material requirement for forming the filling connector can be reduced by comparison with the prior art. In the case of water or gas injection technology, flowable plastics material is also displaced directly by the injected fluid.

In gas pipelines manufactured using projectile injection technology, the moulding material is displaced indirectly by the fluid and directly by a projectile driven by the fluid. In this context, the movement of the projectile is driven for example by a fluid ejection nozzle, which conveys pressurised fluid to the projectile and drives said projectile with said fluid.

Whereas in a gas pipeline formed using water and gas injection technology the internal cross-sectional shape and the internal cross-sectional area are largely undefined because of the shapelessness of the fluid which directly displaces the moulding material, a gas pipeline which is formed using projectile injection technology can be formed with an internal cross-section which is particularly uniform along the gas pipeline and has a constant cross-sectional area, since when passing through the moulding material the projectile generally produces a cavity, the cross-section of which substantially corresponds to a projection of the projectile in the movement direction.

In a development of the invention, so as to keep the external dimensions of a filling connector in the radial direction as small as possible, it may be provided that at least an axial portion of the gas pipeline, preferably the entire gas pipeline, is enclosed by the liquid pipeline, the external cross-sectional area of the portion of the gas pipeline enclosed by the liquid pipeline corresponding to at most 20%, preferably at most 15%, particularly preferably at most 10% of the internal cross-sectional area of the liquid pipeline which can be flowed through.

In this context, the volume of the liquid with which a fluid container is filled corresponds to the volume of the gas which is initially present in place of the liquid which is subsequently filled in. Since gas is compressible whilst fluid is treated as incompressible for the purposes of the invention, it is sufficient, for conveying liquid into the container rapidly and without interruption and simultaneously discharging gas which is displaced in the process in the opposite direction, to provide the gas pipeline with a smaller cross-sectional area than the liquid pipeline. In this context, the cross-sectional ratios defined above have been found to be particularly advantageous.

If furthermore the entire gas pipeline is enclosed by the liquid pipeline, the external shape of the filling connector is defined in its entirety by the external shape of the liquid pipeline. On the one hand, this makes it possible to adapt the external shape of the filling connector to predetermined spatial constraints in a particularly simple manner, and on the other hand, it simplifies the installation of the filling connector.

So as to be able to provide a particularly compact filling connector having small radial dimensions in the region of the liquid inlet opening, it may be provided that at least an axial portion of the gas outlet end portion is enclosed by the liquid inlet end portion, the liquid inlet opening and the gas outlet opening being mutually offset in the axial direction by at most 20%, particularly preferably by at most 10% of the maximum internal diameter of the liquid inlet opening, and particularly preferably being flush.

By taking into account the maximum internal diameter of the liquid inlet opening when setting the offset between the liquid inlet opening and the gas outlet opening, it can be ensured that the position of the gas outlet opening relative to the liquid inlet opening is visible from the outside, in such a way that liquid can be poured selectively past the gas inlet opening into the liquid pipeline, without liquid which is to be filled in accidentally arriving in the gas pipeline and thus obstructing the discharge of gas.

If in this context the gas pipeline does not project beyond the liquid pipeline in the axial direction, a cover of a simple shape, in particular planar, may further be provided for jointly closing the gas pipeline and the liquid pipeline. In this context, the cover may be formed in a single piece with the filling connector by means of a flexible connecting portion or may comprise a fixing portion such as a fixing ring so as to fix the cover securely to the filling connector.

It is further conceivable in this context to form the liquid inlet end portion substantially funnel-shaped, with a cross-sectional area which decreases in the liquid flow direction, so as to make it possible to fill in liquid in a particularly simple and reliable manner. In this context, it is advantageous for the axial length of the funnel-shaped liquid inlet end portion to be at most 15%, preferably at most 10%, particularly preferably at most 5% of the length of the liquid pipeline which can be flowed through. Thus, the radial dimensions of the liquid pipeline are only increased, by comparison with a fluid line having no funnel-shaped liquid inlet end portion, in an axial portion which is small by comparison with the total length of the liquid pipeline which can be flowed through, and the additional material cost by comparison with a filling connector having no funnel-shaped inlet end portion remains small.

So as to be able to capture liquid which sprays out counter to the filling direction when liquid is being filled in, a spray protection element may further be provided in the region of the liquid inlet end portion. This may for example be planar in form and be arranged radially externally enclosing the liquid inlet end portion.

In this context, "planar" basically means that the spray protection element extends over much greater dimensions in two mutually orthogonal spatial directions (primary extension directions) than in a third spatial direction (thickness direction) orthogonal to the two primary extension directions.

In a development of the invention, it may be provided that at least an axial portion of the gas inlet end portion is enclosed by the liquid outlet end portion. As a result, small radial dimensions of the filling connector can be provided in the region of the liquid outlet end portion, since the liquid outlet end portion is the only component determining the shape.

In this context, the liquid outlet opening and the gas inlet opening are mutually offset in the axial direction by at most 50%, preferably by at most 20% of the maximum internal diameter of the liquid outlet opening, and are particularly preferably flush. If the offset between the liquid outlet opening and the gas inlet opening is set in this manner, it can always be ensured, in particular if a liquid container is filled under gravity, that the liquid flow branching off at the gas inlet end portion always converges again outside the liquid pipeline, even at the maximum liquid flow rate. As a result, the gas inlet opening is always accessible to displaced gas, in such a way that reliable discharge of displaced gas can be ensured.

Moreover, the connection of the filling connector to a liquid container is simplified, since now only the liquid outlet end portion which encloses the gas inlet end portion has to be connected to the liquid container.

So as to be able to provide particularly reliable discharge of displaced gas, it may further be provided that when the filling connector is installed the gas inlet opening is arranged in a geodetically upper region of the liquid outlet end portion.

In this context, a geodetically upper region of the liquid outlet end portion means a peripheral portion, which is upward in terms of the direction of gravity, of a liquid outlet end portion, the axial extension of which has a horizontal component. In this way, as the amount of liquid conveyed increases, the liquid outlet end portion is flowed through so as to fill up from a geodetically lower region, in such a way that the geodetically upper region can only be reached in the event of a maximum possible filling amount.

So as to adapt the shape of the filling connector optimally to predetermined installation constraints, it may further be provided that the liquid pipeline, preferably the liquid pipeline and the gas pipeline, is elbowed at least once, preferably repeatedly, along the flow path thereof. In this context, the liquid pipeline may comprise a plurality of straight axial portions, which can be formed in a particularly simple manner using a plurality of mould cores.

In a development of the invention, it may be provided that the gas pipeline is connected to the liquid pipeline in a material fit at least in an axial portion, preferably over the entire axial length. In this context, the gas pipeline and the liquid pipeline may comprise a shared peripheral wall portion, meaning that the material cost for producing the filling connector can be reduced by comparison with a peripheral wall portion having no shared peripheral wall portion. If the liquid pipeline and an axial portion of the gas pipeline enclosed by the liquid pipeline further have a shared peripheral wall portion, only part of the peripheral wall of the gas pipeline in this axial portion projects into the liquid pipeline, in such a way that only a small proportion of the internal cross-sectional area of the liquid pipeline is covered by the gas pipeline as a result.

So as to prevent leaks in the connection region of the filling connector to a liquid container and ensure that gas displaced from the liquid container is discharged selectively via the gas pipeline, it may further be provided that the liquid outlet end portion and the gas inlet end portion comprise a sealing element. If the gas inlet end portion is enclosed by the liquid outlet end portion in this context, a shared sealing element may be used.

It may further be provided that at least one fastening means, formed in a single piece with the filling connector, is provided for fastening the filling connector. This may for example be in the form of a plate-shaped element, which has an opening for receiving a screw and is formed integrally with for example the wall of the liquid pipeline.

The filling connector may further comprise at least one mounting element, preferably for an electric line and/or a tube. For example, electric lines leading to a pump arranged in the region of a liquid container or tubes leading away from the pump can be fastened in a particularly simple manner by way of a mounting element of this type.

In accordance with a second aspect of the invention, the object defined above is achieved by a method for manufacturing a filling connector according to the invention, comprising the steps of:
a) filling an injection moulding mould with flowable moulding material, the injection moulding mould comprising a mould cavity having a shape complementary to the external shape of the filling connector,
b) carrying out a displacement step by fluid injection so as to displace filled-in flowable moulding material in part to form the gas pipeline, and
c) demoulding the shaped body from the injection moulding mould.

Since the flow path of the injected fluid can be adapted exactly to the shape of the desired filling connector, using cavity portions provided specifically for this purpose, the method according to the invention makes it possible to form a gas pipeline with a sufficient internal cross-sectional area on a filling connector of virtually any desired shape.

Even though it is preferred, as stated above, for the liquid pipeline to enclose at least an axial portion of the gas pipeline, it may also be provided in the context of the present invention that no axial portion of the gas pipeline is enclosed by the liquid pipeline. In this case, it may be provided in a development of the invention that the displacement step in step b) is provided for forming the gas pipeline and the liquid pipeline. In this context, the gas pipeline is in fact arranged fully outside the liquid pipeline as is already known in the art; however, unlike in the art, both the gas pipeline and the liquid pipeline can be formed with virtually any desired external shapes and with sufficient internal cross-sectional areas.

It may further be provided that the fluid injection step comprises a water injection step or a gas injection step.

For cost reasons, water is particularly advantageous as a fluid for injection. Water additionally has the advantage of cooling moulding material particularly effectively when flowing through, in such a way that low cycle times can be achieved as a result.

An inert gas, preferably nitrogen, may be used as a gas for injection. Using gas injection technology, smaller cross-sectional areas can be achieved than with water injection technology, and in contrast to water gas can escape from gas pipelines of virtually any shape without difficulty.

Further, in the fluid injection step, flowable moulding material can be displaced directly or indirectly, preferably via a projectile, by injected fluid. If a projectile is used, the movement thereof is driven for example by a fluid ejection nozzle, which conveys pressurised fluid to a projectile and drives said projectile with said fluid. When the projectile passes through the moulding material, the projectile creates a cavity, the cross-section of which approximately corresponds to a projection of the projectile in the movement direction. In this way, the gas pipeline can be formed with an internal cross-sectional shape which is particularly uniform along the gas pipeline and has a constant internal cross-sectional area.

For cost reasons, it may further be provided that moulding material which is displaced from the injection moulding mould is captured for reuse as moulding material.

In a development of the invention, the internal shape of the liquid pipeline may be formed by means of at least one mould core, having a shape which is complementary to the internal shape of the liquid pipeline, preferably to the internal shape of the liquid pipeline and to the external shape of at least an axial portion of the gas pipeline.

The use of a mould core to form the internal shape of the liquid pipeline is necessary if at least an axial portion of the gas pipeline is enclosed by the liquid pipeline, since in this context the mould core receives part of the fluid pressure and thus prevents damage to a gas pipeline wall which has not yet cured during the injection step.

So as to be able, in a particularly simple manner, to manufacture a liquid pipeline which is elbowed along the flow path thereof and an angled gas pipeline which is enclosed by the liquid pipeline, the internal shape of the liquid pipeline may further be formed by means of a plurality of mould cores, at least two of the mould cores comprising concave axial portions to form the external shape of a portion of the gas pipeline which is enclosed by the liquid pipeline, the concave axial portions being interconnected in the transition region, preferably without interruptions.

The present invention is described in greater detail in the following by way of the appended drawings, in which:

FIG. 1 shows a filling connector, denoted as a whole as 10. The filling connector 10 shown in FIG. 2 corresponds to that of FIG. 1, and is rotated about an axis A with respect thereto.

Figure 1:
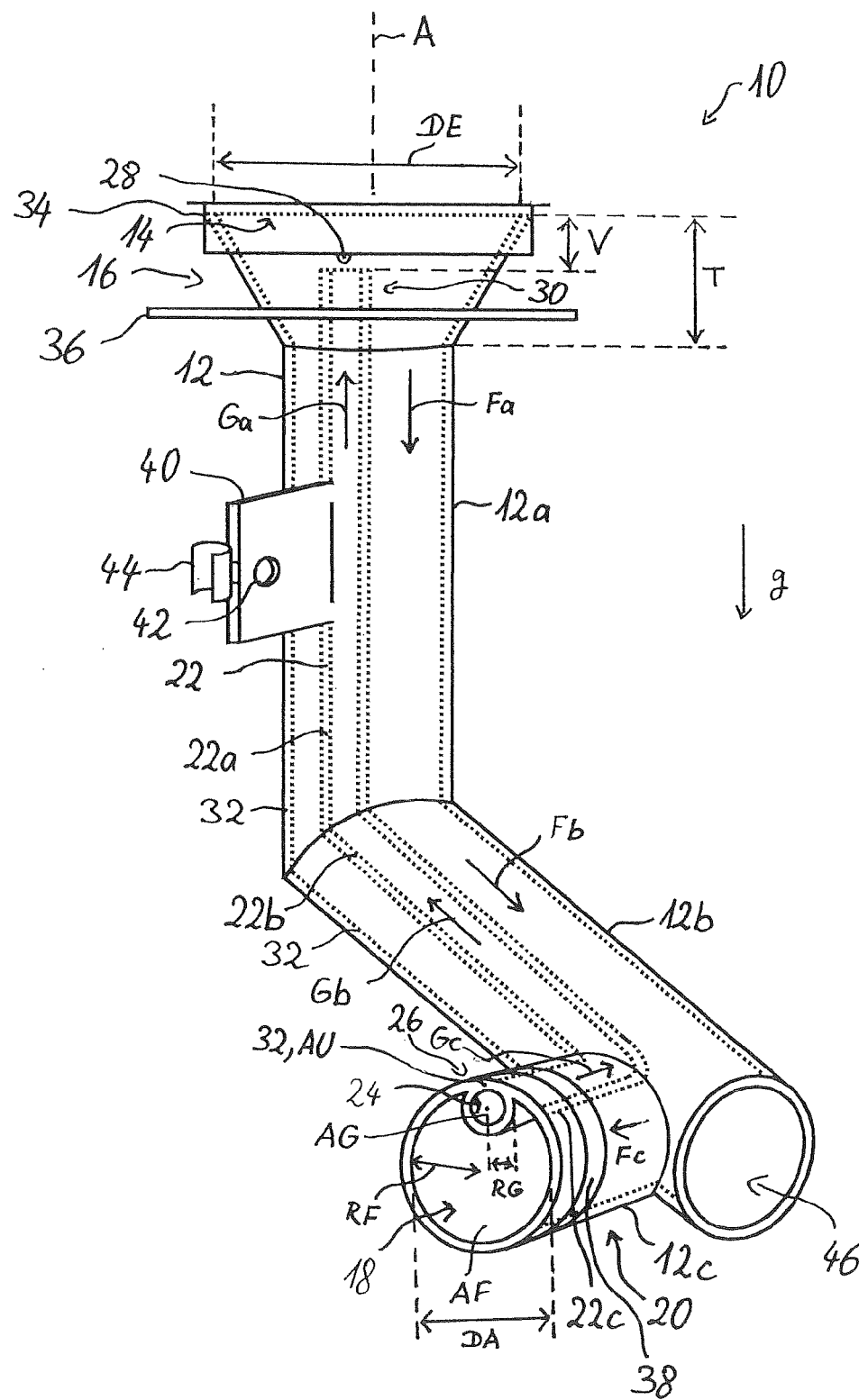
FIG. 1 is a perspective view of a filling connector according to the invention.
Figure 2:
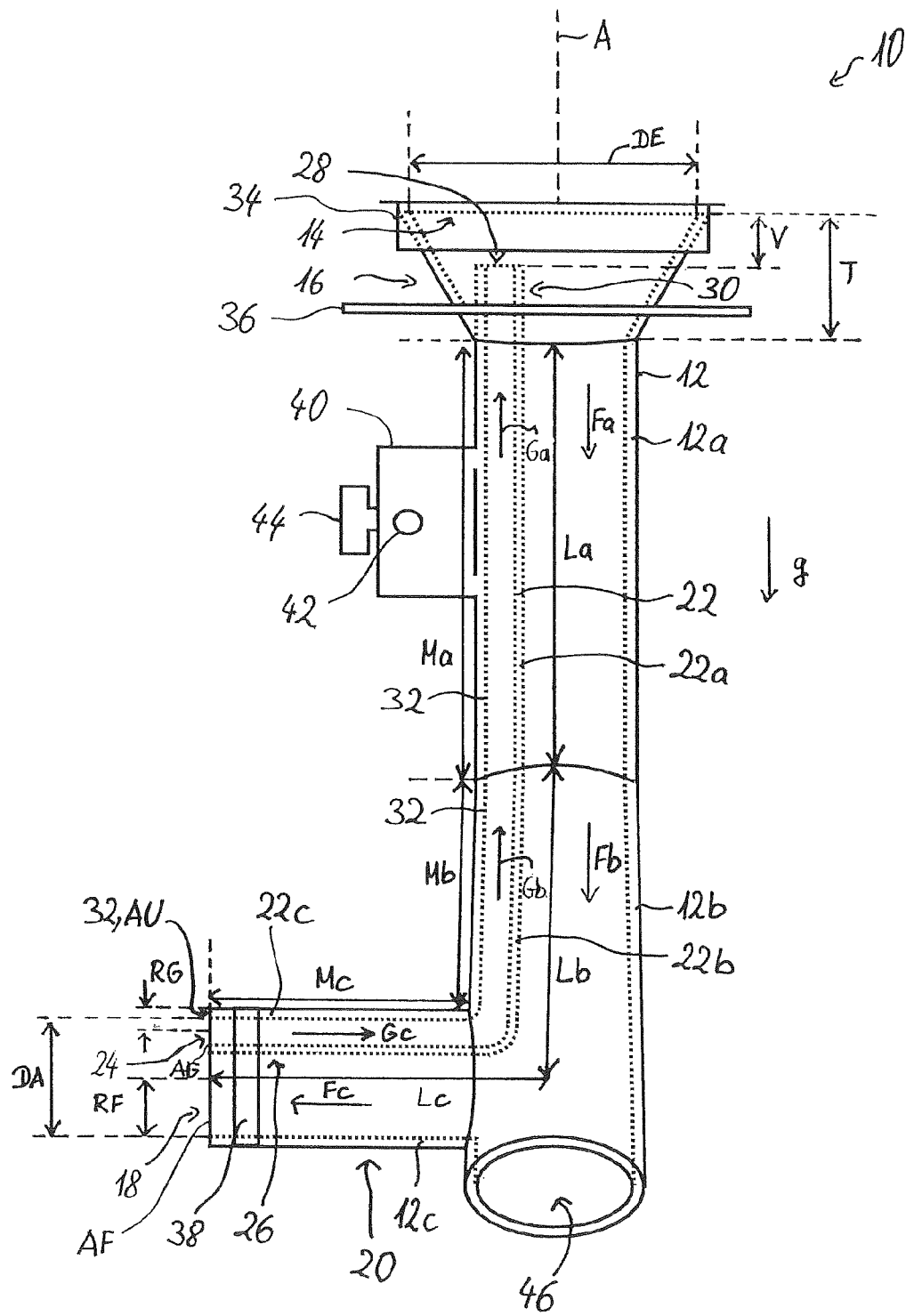
FIG. 2 is a further perspective view of the filling connector shown in FIG. 1.

The filling connector 10 shown in FIGS. 1 and 2 comprises a liquid pipeline 12. This can be elbowed along the flow path thereof. Preferably, the liquid pipeline is elbowed repeatedly, having a plurality of straight axial portions 12a, 12b, 12c for conveying liquid in a liquid flow direction Fa, Fb, Fc from a liquid inlet end portion 16 having a liquid inlet opening 14 to a liquid outlet end portion 20 having a liquid outlet opening 18. In this context, the liquid is preferably conveyed under the effect of gravity on the liquid which is to be filled in. The direction of gravity g may be substantially parallel to the liquid flow direction Fa in an axial portion 12a of the liquid pipeline 12, as shown in the drawings.

The filling connector 10 also comprises a gas pipeline 22 which is formed integrally with the liquid pipeline 12. This may be elbowed along the flow path thereof. Preferably, the gas pipeline 22 is elbowed repeatedly, having a plurality of straight axial portions 22a, 22b, 22c for conveying gas in the opposite flow direction, in a gas flow direction Ga, Gb, Gc, while liquid is conveyed through the liquid pipeline 12, from a gas inlet end portion 26 having a gas inlet opening 24 to a gas outlet end portion 30 having a gas outlet opening 28. In this context, the liquid pipeline 12 and the gas pipeline 22 may have mutually parallel pipe central axes in at least one axial portion.

In this case, as shown in the drawings, the gas pipeline 22 may be enclosed by the liquid pipeline 12 along the entire axial extension thereof, and be connected thereto in a material fit in a plurality of axial portions Ma, Mb, Mc. In this context, the gas pipeline 22 and the liquid pipeline 12 may comprise a shared peripheral wall portion 32.

In the present embodiment, both the liquid pipeline 12 and the gas pipeline 22 may have for example approximately circular cross-sections. In this case, the internal cross-sectional area AF of the liquid pipeline 12 which can be flowed through is given by $\pi \cdot (RF^2 - RG^2) + AU$, where RF is the internal radius of the liquid pipeline 12, RG is the external radius of the gas pipeline 22, and AU is the cross-sectional area of the shared peripheral wall portion 32. So as to be able to provide a sufficient internal cross-sectional area AF which can be flowed through, it is advantageous for the external cross-sectional area $AG = \pi \cdot RG^2$ of the gas pipeline 22 to correspond to at most 20%, preferably at most 15%, particularly preferably at most 10% of the internal cross-sectional area AF of the liquid pipeline 12 which can be flowed through.

In this context, it should be noted that the radii RF and RG and the cross-sectional area AU of the shared peripheral wall portion 32 need not necessarily be constant along the flow path of the liquid pipeline 12 or the gas pipeline 22. Thus, for example, as shown in the drawings, the liquid inlet end portion 16 may be formed in a funnel shape, having a cross-sectional area which decreases in the liquid flow direction Fa, so as to make it possible to fill in liquid in a simple manner. In this context, it is advantageous for the axial length T of the funnel-shaped liquid inlet end portion 16 to be at most 15%, preferably at most 10%, particularly preferably at most 5% of the length T+La+Lb+Lc of the liquid pipeline 12 which can be flowed through. In this context, La, Lb and Lc are the lengths of the respective straight axial portions 12a, 12b, 12c of the liquid pipeline 12 which can be flowed through.

The gas outlet end portion 30, which as shown in the drawings may not be connected to the liquid pipeline 12 in a material fit, may be enclosed by the liquid inlet end portion 16. In this context, the liquid inlet end portion 16 may project beyond the gas outlet end portion 30 in the gas flow direction Ga, in such a way that the liquid inlet opening 14 and the gas outlet opening 28 are mutually offset. This offset V may be at most 20%, preferably at most 10% of the maximum internal diameter DE of the liquid inlet opening 14. In principle, however, it is also conceivable for the gas outlet end portion 30 to project beyond the liquid inlet end portion 16 in the gas flow direction Ga, or for the liquid inlet opening 14 and the gas outlet opening 28 to be flush.

Accordingly, the liquid outlet opening 18 and the gas inlet opening 24 may be mutually offset in the axial direction or be flush as shown in the drawings. The offset between the liquid outlet opening 18 and the gas inlet opening 26 may be at most 50%, preferably at most 20% of the maximum internal diameter DA of the liquid outlet opening 18.

Furthermore, in the present embodiment the gas inlet end portion 26 may be enclosed by the liquid outlet end portion 20. In this context, the gas inlet opening 24 may be arranged in a geodetically upper region of the liquid outlet end portion 20 once the filling connector 10 is installed.

In this context, a geodetically upper region of the liquid outlet end portion 20 means a peripheral portion, which is upward in terms of the direction of gravity g, of the liquid outlet end portion 20. In this way, when liquid is conveyed, as the amount of liquid conveyed increases, the liquid outlet end portion 20 is flowed through so as to fill up from a geodetically lower region, in such a way that the geodetically upper region can only be reached in the event of a maximum possible filling amount.

In the embodiment shown in the drawings, the liquid inlet opening 14 and the gas outlet opening 28 can be sealed with a shared cover 34. The cover 34 may further be formed in a single piece with the filling connector 10 by means of a flexible connecting portion or may comprise a fixing portion such as a fixing ring so as to fix the cover 34 securely to the filling connector 10.

Further, so as to be able to capture liquid which sprays out counter to the filling direction, a spray protection element 36 may be provided in the region of the liquid inlet end portion 16, as shown in the drawings. In the present embodiment, this may for example be planar in form and be arranged radially externally enclosing the liquid pipeline 12.

So as to prevent leaks in the connection region of the filling connector 10 to a liquid container (not shown here) and ensure that gas displaced from the liquid container is discharged selectively via the gas pipeline 22, it may further be provided that the liquid outlet end portion 20 and the gas inlet end portion 26 comprise a shared sealing element 38, for example in the form of a rubber ring.

Furthermore, a fastening means 40, formed in a single piece with the filling connector 10, may be provided for fastening the filling connector 10. This may for example be in the form of a plate-shaped element, which has a receiving opening 42 for receiving a screw and may for example be formed integrally with the liquid pipeline 12.

The filling connector 10 may further, as shown in the drawings, comprise a mounting element 44 for fixing for example electric lines leading to a delivery pump or tubes leading away from the pump.

The filling connector 10 shown in the drawings is in the form of an injection-moulded part, the gas pipeline 22 being formed using injection technology, such as fluid injection technology. In this context, water or gas is preferred as the fluid for injection, it being possible to use the fluid directly or indirectly, for example via a projectile, to form the gas pipeline 22. In principle, the liquid pipeline 12 may also be formed using injection technology if the gas pipeline is arranged entirely outside the liquid pipeline.

If, as shown in the drawings, the liquid pipeline 12 encloses the gas pipeline 22 along the entire axial extension thereof, the liquid pipeline 12 may be formed with a plurality of mould cores for forming the respective straight axial portions 12a, 12b, 12c of the liquid pipeline 12. In this context, the mould cores may comprise concave axial portions for forming the external shape of the respective straight axial portions 22a, 22b, 22c of the gas pipeline 22, the concave axial portions being interconnected in the transition region, preferably without interruptions. When the filling connector 10 is demoulded from the injection moulding mould, the mould core which is used for forming the axial portion 12a of the liquid pipeline 12 can be removed through the liquid inlet opening 14, the mould core which is used for forming the axial portion 12b of the liquid pipeline 12 can be removed through an additional opening 46, and the mould core which is used for forming the axial portion 12c of the liquid pipeline 12 can be removed through the liquid outlet opening 18. In this context, the additional opening 46 is sealed in operation by means of a protective cap (not shown in the drawings).

The invention claimed is:

1. A filling connector for filling a liquid container, the filling connector comprising:
   a liquid pipeline, for conveying liquid in a flow direction from a liquid inlet end portion having a liquid inlet opening to a liquid outlet end portion having a liquid outlet opening; and a gas pipeline, for conveying gas in an opposite flow direction while liquid is conveyed through the liquid pipeline, the opposite flow direction being from a gas inlet end portion having a gas inlet opening to a gas outlet end portion having a gas outlet opening, the liquid pipeline and the gas pipeline being formed integrally with one another;

wherein the filling connector is formed as an injection-moulded part, with the gas pipeline being manufactured using injection technology;

wherein the position of the gas outlet opening relative to the liquid inlet opening is visible from the outside during any pouring of a liquid in such a way that the liquid can be poured selectively past the gas outlet opening into the liquid pipeline;

wherein at least one axial portion of the gas pipeline is enclosed by the liquid pipeline; and wherein the external cross-sectional area of the at least one axial portion of the gas pipeline enclosed by the liquid pipeline corresponds to at most 20% of the internal cross-sectional area of the liquid pipeline which can be flowed through.

2. The filling connector according to claim 1, characterised in that at least an axial portion of the gas outlet end portion is enclosed by the liquid inlet end portion, the liquid inlet opening and the gas outlet opening being mutually offset in the axial direction by at most 20% of the maximum internal diameter of the liquid inlet opening.

3. The filling connector according to claim 2, wherein the liquid inlet opening and the gas outlet opening are mutually offset in the axial direction by at most 10% of the maximum internal diameter of the liquid inlet opening, and are flush with each other.

4. The filling connector according to claim 1, characterised in that at least an axial portion of the gas inlet end portion is enclosed by the liquid outlet end portion, the liquid outlet opening and the gas inlet opening being mutually offset in the axial direction by at most 50% of the maximum internal diameter of the liquid outlet opening.

5. The filling connector according to claim 4, wherein the liquid outlet opening and the gas inlet opening are mutually offset in the axial direction by at most 20% of the maximum internal diameter of the liquid outlet opening, and are flush with each other.

6. The filling connector according to claim 1, characterised in that when the filling connector is installed the gas inlet opening is arranged in a geodetically upper region of the liquid outlet end portion.

7. The filling connector according to claim 1, characterised in that the liquid pipeline is elbowed at least once along the flow path thereof.

8. The filling connector according to claim 7, wherein the liquid pipeline and the gas pipeline are elbowed repeatedly along the flow path thereof.

9. The filling connector according to claim 1, characterised in that the gas pipeline is connected to the liquid pipeline in a material fit at least in an axial portion.

10. The filling connector according to claim 9, wherein the material fit over the entire axial length.

11. The filling connector according to claim 1, characterised in that the liquid outlet end portion and the gas inlet end portion comprise a sealing element.

12. The filling connector according to claim 11, wherein the liquid outlet end portion and the gas inlet end portion share the sealing element.

13. The filling connector according to claim 1, characterised in that at least one fastening means, formed in a single piece with the filling connector, is provided for fastening the filling connector.

14. The filling connector according to claim 1, characterised in that the filling connector comprises at least one mounting element.

15. The filling connector according to claim 14, wherein the at least one mounting element is adapted to mount an electric line and/or a tube.

16. The filling connector according to claim 1, wherein the gas pipeline is enclosed by the liquid pipeline.

17. The filling connector according to claim 16, wherein the enclosed gas pipeline is off-center relative to the liquid pipeline.

18. The filling connector according to claim 1, wherein the injection technology used to manufacture the gas pipeline is water injection technology.

19. The filling connector according to claim 1, wherein the injection technology is gas injection technology or projectile injection technology.

20. The filling connector according to claim 1, wherein the external cross-sectional area of the at least one axial portion of the gas pipeline enclosed by the liquid pipeline corresponds to at most 20% of the internal cross-sectional area of the liquid pipeline which can be flowed through.

21. The filling connector according to claim 20, wherein the external cross-sectional area of the at least one axial portion of the gas pipeline enclosed by the liquid pipeline corresponds to at most 10% of the internal cross-sectional area of the liquid pipeline which can be flowed through.

* * * * *

UNITED STATES PATENT AND TRADEMARK OFFICE
CERTIFICATE OF CORRECTION

PATENT NO. : 9,539,776 B2
APPLICATION NO. : 14/057114
DATED : January 10, 2017
INVENTOR(S) : Mirco Brusco Page 1 of 1

It is certified that error appears in the above-identified patent and that said Letters Patent is hereby corrected as shown below:

On the Title Page

Item (71), under Applicant: "ROECHLING AUTOMOTIVE AG & CO. KG, Mannheim (DE)" should read as -- ROECHLING AUTOMOTIVE SE & CO. KG, Mannheim (DE) --.

Signed and Sealed this
Ninth Day of January, 2018

Joseph Matal
*Performing the Functions and Duties of the
Under Secretary of Commerce for Intellectual Property and
Director of the United States Patent and Trademark Office*